United States Patent [19]
Müller

[11] Patent Number: 5,834,873
[45] Date of Patent: Nov. 10, 1998

[54] BRUSHLESS THREE-PHASE DC MOTOR

[75] Inventor: Rolf Müller, Munich, Germany

[73] Assignee: Papst Licensing GmbH, Germany

[21] Appl. No.: 448,006

[22] Filed: May 23, 1995

Related U.S. Application Data

[63] Continuation of Ser. No. 154,383, Nov. 18, 1993, Pat. No. 5,418,416, which is a continuation of Ser. No. 902,474, Jun. 19, 1992, abandoned, which is a continuation of Ser. No. 620,645, Nov. 30, 1990, abandoned, which is a continuation of Ser. No. 66,471, Jun. 26, 1987, abandoned, which is a continuation of Ser. No. 607,688, May 7, 1984, abandoned.

[30] Foreign Application Priority Data

Sep. 5, 1983 [DE] Germany ........................... 33 31 940.5
Sep. 5, 1983 [DE] Germany ........................... 83 25 441 U

[51] Int. Cl.$^6$ ............................... H02K 1/10; H02K 1/14
[52] U.S. Cl. ........................... 310/186; 310/173; 318/254
[58] Field of Search ....................... 318/254, 138; 310/68 B, 186, 259, 173, 135, 159, 185, 184

[56] References Cited

U.S. PATENT DOCUMENTS

| | | | |
|---|---|---|---|
| 3,549,967 | 12/1970 | Uemura et al. | 318/138 |
| 3,903,463 | 9/1975 | Kanamori | 318/138 |
| 3,988,654 | 10/1976 | Takahashi et al. | 318/254 |
| 4,074,173 | 2/1978 | Janssen | 318/138 |
| 4,164,690 | 8/1979 | Müller et al. | 318/254 |
| 4,275,339 | 6/1981 | Burke et al. | 318/138 |
| 4,322,666 | 3/1982 | Muller | 318/254 |
| 4,359,763 | 11/1982 | Hoffman | 360/99 |
| 4,418,303 | 11/1983 | Abe et al. | 318/254 |
| 5,418,416 | 5/1995 | Muller | 310/186 |

FOREIGN PATENT DOCUMENTS 2 593 974  6/1987  France .
56860  4/1984  Japan ........................... 310/159

OTHER PUBLICATIONS

German article entitled, "Gleichstrommotoren mit elektronischem Kommutator—Prinzipien und Anwendungen zweipulsiger Kollektorloser Gleichstrommotoren," by Von Dr.—Ing. R. Müller, St. Georgen, *VDI–Berichte NR. 482, 1983*, (Month Unknown).

Primary Examiner—Thomas M. Dougherty
Assistant Examiner—Judson H. Jones
Attorney, Agent, or Firm—Fitch, Even, Tabin & Flannery

[57] ABSTRACT

A three-phase brushless dc motor includes a permanent-magnet rotor magnet arrangement having at least four poles and a Y-connected, or star-connected, three-phase stator winding. The winding's phases are arranged non-overlapping in slots of a slotted stator, the currents flowing in the three phases being controlled via at least three semiconductor elements by at least three magnetic-field-sensitive rotor position sensors. Each sensor is associated with a respective two of the winding's three phases and triggers a commutation which switches off the current in one of the associated two phases and switches on the current in the other of the associated two phases. The sensors are located to sense the permanent-magnet flux emanating from the rotor poles themselves. The rotor position sensors are provided at special angular locations on the stator. Each sensor is provided at an angular location at which there is not to be found, neither prior to nor subsequent to the commutation associated with that sensor, any energized stator pole; this may mean that the sensor location is (i) an angular location at which no energizable stator pole whatever is present, and it may mean that the sensor location is (ii) an angular location at which an energizable stator pole is in fact present, but during motor operation this energizable stator pole is in an unenergized state prior to a commutation associated with the particular sensor in question and likewise is in unenergized state subsequent to that commutation.

6 Claims, 3 Drawing Sheets

BRUSHLESS THREE-PHASE DC MOTOR

This application is a Continuation of application Ser. No. 08/154,383, filed Nov. 18, 1993, U.S. Pat. No. 5,418,416, which is a Continuation of application Ser. No. 07/902,474, filed Jun. 19, 1992, now abandoned, is a Continuation of application Ser. No. 07/620,645, filed Nov. 30, 1990, now abandoned, which is a Continuation of application Ser. No. 07/066,471, filed Jun. 26, 1987, now abandoned, which is a Continuation of Ser. No. 06/607,688, filed May 7, 1984, now abandoned.

BACKGROUND OF THE INVENTION

The invention concerns a three-phase brushless dc motor with a permanent-magnet rotor magnet arrangement having at least two pole pairs and a star-connected, three-phase stator winding, the winding's phases being arranged non-overlapping in slots of a slotted stator, with their currents being controlled via at least three semiconductor elements by at least three magnetic-field-sensitive position sensors, the latter in turn being controlled by the rotor magnet arrangement.

With motors controlled in this manner, especially in the case of motors operating at high power, there arises the problem of the field from the stator winding influencing the magnetic-field-sensitive position sensors although in theory, of course, these sensors should be responsive only to the rotor magnet poles. As a result of such influence, the commutation time points are in an undesirable fashion shifted from their predetermined optimal times of occurrence. This is because any part of the stator-winding field that happens to be incident upon one of the rotor-position sensors is wrongly interpreted by the latter as part of the flux coming from a rotor-magnet pole. Accordingly, this problem becomes more severe, the higher the winding's current.

SUMMARY OF THE INVENTION

Therefore an object of the invention is to so design a dc motor of the stated type as to substantially prevent a shifting of the commutation time points under the influence of the currents flowing in the stator winding.

According to the invention this object is achieved in a surprisingly simple manner by choosing the respective angular locations for the position sensors in a special manner relative to the coils of the three phases. Usually, each position sensor triggers or in another manner commands commutation or switchover of the winding's current from a first to a second one of two phases associated with that particular position sensor. In accordance with the present invention, in such event, each sensor element is placed at an angular location on the stator at which there is not to be found, neither prior to nor subsequent to the commutation associated with that sensor, any energized stator pole. This may mean that such sensor's location is (i) an angular location that is circumferentially intermediate two circumferentially spaced, neighboring energizable stator poles, to thereby be an angular location at which an energizable stator pole is not present; and the foregoing may mean that the sensor's location is (ii) an angular location at which an energizable stator pole is indeed present, but during motor operation this stator pole is in an unenergized state prior to a commutation associated with the sensor in question and likewise is in unenergized state subsequent to that commutation.

With the motor according to the invention the magnetic-field-sensitive position sensors remain uninfluenced by the stator winding's field during the commutation. Even in the case of higher winding currents there does not occur an undesired displacement of the commutation time points.

In accordance with a further feature of the invention the number of stator poles stands in the ratio 3:4 to the number of rotor poles, each of the stator poles having a breadth of substantially 180°-el. As a result a chording is avoided. A particularly high efficiency is achieved. The torque developed by the motor is substantially uniform.

It has proved especially advantageous to locate each position sensor substantially midway, considered in the circumferential direction, between those neighboring coils as between which the commutation of the winding's current occurs under the influence of that particular position sensor.

According to a further embodiment each position sensor can also be located substantially on the radial symmetry axis of a stator pole carrying a coil of the one phase that is not involved in the commutation operation triggered by that particular position sensor.

The motor can be designed as a three-pulse motor or else as a six-pulse motor, in the latter case it having preferably at least four magnetic pole pairs.

Preferably, at the air gap, the space remaining in the circumferential direction between each two neighboring, preferably 180°-el.-wide stator poles is substantially filled up by an unwound auxiliary stator pole. The auxiliary stator poles very effectively avoid a magnetic jolt, because an approximately uniform induced voltage is obtained over a relatively large angle, which means a uniform torque at constant current. Without such auxiliary poles between 180°-el.-wide stator poles, in the case of a ratio of stator poles to rotor poles of 3:4 the stator poles would be, functionally, wider than 180°-el. because a great part of the rotor's magnetic field appearing in the pole gaps, would be attracted to the stator poles. There would set in an undesired manner a chording action.

In the case of the motors set forth above—but also in general in the case of brushless dc motors with a permanent-magnet rotor magnet arrangement and a slotted stator carrying a stator winding wound without overlap, the stator having a succession of poles that are of one piece with one another, e.g. stamped out in conventional manner from Dynamo sheet metal—it is desirable that, on the one hand, the slot openings be kept small but, on the other hand, that the slot openings be large enough to facilitate insertion of the winding's constituent coils during the fabrication. In accordance with the invention this problem is solved in that the auxiliary poles are provided as separate parts which can be inserted between main poles and be connected to the stator afterwards. During the winding procedure the auxiliary poles are left off. As a result the winding can be installed in the stator slots unproblematically. The auxiliary poles are installed only when the stator windings have been formed. These later installable auxiliary poles can advantageously form the aforesaid unwound auxiliary poles.

In accordance with a further feature of the invention the auxiliary poles are insertable into recesses of the stator winding's core. Whereas the latter advantageously involves, in conventional manner, a stack of sheet metal, each auxiliary pole is preferably formed as a one-piece pole body. In particular the auxiliary poles can be formed from solid material or as sintered bodies. Because the auxiliary poles, in correspondence to their relatively short circumferential extent, accept only a relatively small magnetic flux, eddy-current losses, in particular, remain low even in the case of solid auxiliary poles. Manufacture from sintered iron has the advantage that by means of powder-metallurgy techniques very exact shapes can be manufactured without there being a need to thereafter do further material-removing machining work. Furthermore, for electro-technical applications there are commercially available also suitable siliconized iron types, such as e.g. from the Vakuumschmelze Company under the trade name "Trafoperm".

The auxiliary poles can advantageously be provided with recesses suited for accommodating the position sensor; the latter can involve, in particular, Hall generators, Hall-IC's or similar magnetic sensors. In the case that sintering techniques are used such recesses can be formed in particularly simple manner.

The invention is explained in greater detail below with respect to preferred embodiments.

DESCRIPTION

Figure 1:
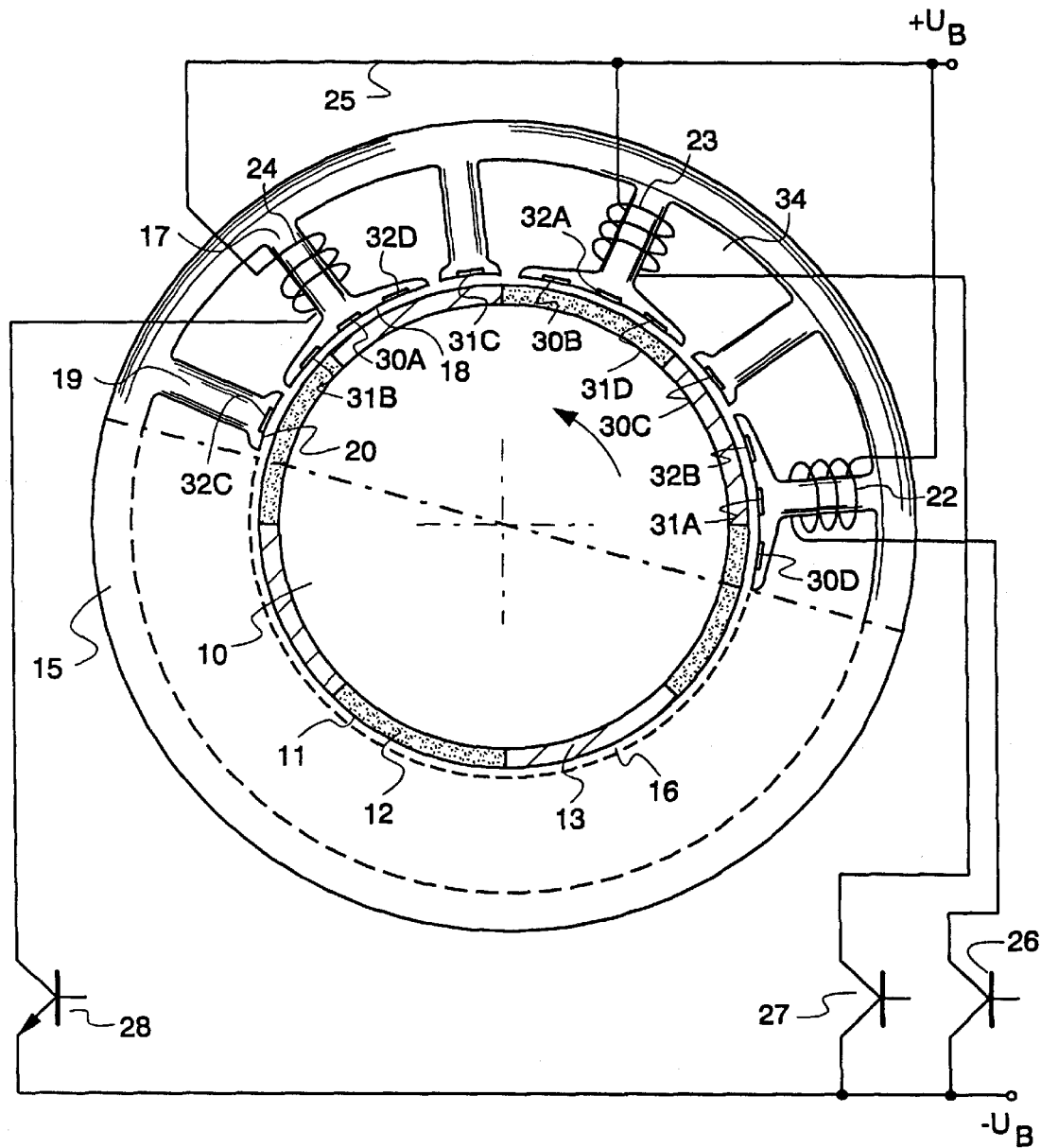
FIG. 1 depicts, schematically, a sectional view of a dc motor according to the invention.

The three-phase brushless dc motor of FIG. 1 has a rotor 10, rotatably mounted in a manner not illustrated in detail, with a permanent-magnet rotor magnet arrangement 11. The rotor magnet arrangement 11 is preferably formed from a rubber-magnet strip, i.e. a one-piece strip made of a mixture of hard ferrite, e.g., barium ferrite, and elastic material. The magnet strip is radially magnetized; its magnetization pattern has the shape of a trapezoid, or approximately a trapezoid, extending over the pole pitch, with relatively small pole gaps. It forms in the illustrated embodiment four pole pairs which at their outer peripheral surfaces constitute, alternately, magnetic north poles 12 and magnetic south poles 13. It is to be understood that other magnetic materials can be used too, and that the rotor magnet arrangement can also be assembled from individual magnetic plates.

The rotor 10 is encircled by a stator 15, preferably in the form of a laminated stack of sheet metal, forming a cylindrical air gap 16. Only one-half of the stator 15 is depicted; the other half is configured symmetrically in correspondence thereto. The stator 15 has six T-shaped main poles 17. The pole faces 18 of the main poles 17 face the air gap 16 and each extends for an angle of 180°-el., i.e., the width of each of the six main poles is, at the air gap 16, equal to the width of each of the eight rotor poles 12, 13. In this way, at the air gap 16, there result between the main poles 17 gaps which are each 60°-el. wide. These gaps are substantially filled up by auxiliary poles 19, i.e., the pole faces 20 of the auxiliary poles 19 extend from a breadth of almost 60°-el.; they end at a small distance, in the circumferential direction, from the respective neighboring main-pole face 18. Each of the main poles 17 carries a stator coil, of which in FIG. 1 the three stator coils 22, 23, 24 are depicted. Corresponding stator coils—which can be connected in series with their respective diametrically opposite stator coils 22 or 23 or 24—are provided on the three non-illustrated main poles. The stator coils altogether form a star-connected, three-phase stator winding whose constituent coils do not overlap one another. As a result the axial ends of the coils are specially short in the axial direction, which is advantageous not only for spatial reasons but also leads to low winding resistance. In the arrangement of FIG. 1 the common or star junction of the stator winding is connected via a line 25 to the positive side $+U_B$ of a voltage source; the star junction is connected to a respective first end of each of coils 22, 23, 24. The other end of each of these coils is connected, via its associated series-connected, diametrically opposite coil (not shown) to a respective semiconductor switch 26, 27 or 28, and then via a respective one of these switches to the negative side $-U_B$ of the voltage source. For the commutation operations the semiconductor switches 26, 27, 28 are controlled by the magnetic-field-sensitive position sensors 30, 31, 32. The position sensors can in particular be Hall generators or Hall IC's which are, in turn, controlled by the rotor magnet arrangement 11.

As a result of the given geometry, the position sensor 30 can be arranged on the stator at eight different angular locations along the air gap 16, of which four locations are denoted by 30a, 30b, 30c and 30d in FIG. 1. The other four possible angular locations are located diametrically opposite to respective ones of the locations just stated. It has been found that one can in a simple way avoid the position sensors being exposed to the field from the stator coils, and avoid the resulting undesired shifting of the commutation time points, by locating the position sensors 30, 31, 32 at the air gap 16 at specially determined angular locations. As defined earlier in the general discussion of the invention further above, each sensor is placed at an angular location at which there is not to be found, neither prior to nor subsequent to the commutation commanded by that sensor, any energized stator pole; as stated earlier and as will become clearer below, this may mean that such sensor's location is (i) an angular location at which no energizable stator pole whatever is present; likewise, this may mean that the sensor's location is (ii) an angular location at which an energizable stator pole is in fact present, but during motor operation this stator pole is in unenergized state prior to a commutation associated with the sensor in question and likewise is in unenergized state subsequent to that commutation. The position sensor 30 triggers or commands the commutation from the stator coil 22 to the stator coil 23, rendering the semiconductor switch 26 non-conductive and rendering the semiconductor switch 27 conductive. The criterion stated just above is fulfilled for position sensor 30 if the latter is arranged at the angular positions 30a or 30c; in contrast, it is not fulfilled at the positions 30b and 30d. The position 30a is located on the radial symmetry axis of the main pole 17 carrying the coil 24, i.e., a coil of the one phase that is not involved in the commutation operation triggered by position sensor 30. The second advantageous position 30c for the position sensor 30 is at the auxiliary pole 19 located angularly intermediate the two stator coils 22 and 23; these are coils of the two phases that are involved in the commutation or switchover commanded by position sensor 30. In contrast, the two further positions 30b and 30d for the position sensor 30 do not satisfy the aforesaid criterion. At position 30b the position sensor 30 would be exposed to the magnetic field from coil 23 after the commutation operation, whereas at position 30d the position sensor 30 would be exposed to the field from coil 22 prior to the commutation in question.

Corresponding remarks apply to the other two position sensors 31, 32; the positions in principle possible for these within the illustrated region of 180°-mech. are denoted by 31a, 31b, 31c, 31d and 32a, 32b, 32c, 32d, respectively. Here again, of these positions only the positions 31a and 31c for sensor 31 and 32a, 25 and 32c for sensor 32, fulfill the criterion in question.

The foregoing discussion of FIG. 1 presupposes a certain known type of three-pulse operation, i.e. the rendering conductive at any given time of only one of the winding's three phases, the flow of current through each of the winding's phases always being in the same direction, as depicted graphically in FIG. 4 and reviewed further below. The stator coils 22, 23, 24, and their non-illustrated diametrically opposite partners, and the semiconductor switches 26, 27, 28 accordingly form a circuit configuration which can be designated as half of a bridge circuit. However, the invention is not limited thereto. The described motor can instead operate with a full bridge circuit permitting a reversal of the direction of the current in each phase (such a full bridge circuit is for example known from FIG. 6B of DE-OS 30 44 027), and the motor can thusly be operated in six-pulse fashion, in which case at any given time two of the winding's phases carry current simultaneously. Referring to FIG. 1 it may be noted that, in the case of six-pulse operation, only the positions 30c, 31c, 32c fulfill the inventive criterion.

The use of at least eight permanent-magnet poles has furthermore the advantage that the forces exerted on the rotor shaft are symmetrical with respect to the motor axis.

Figure 4:
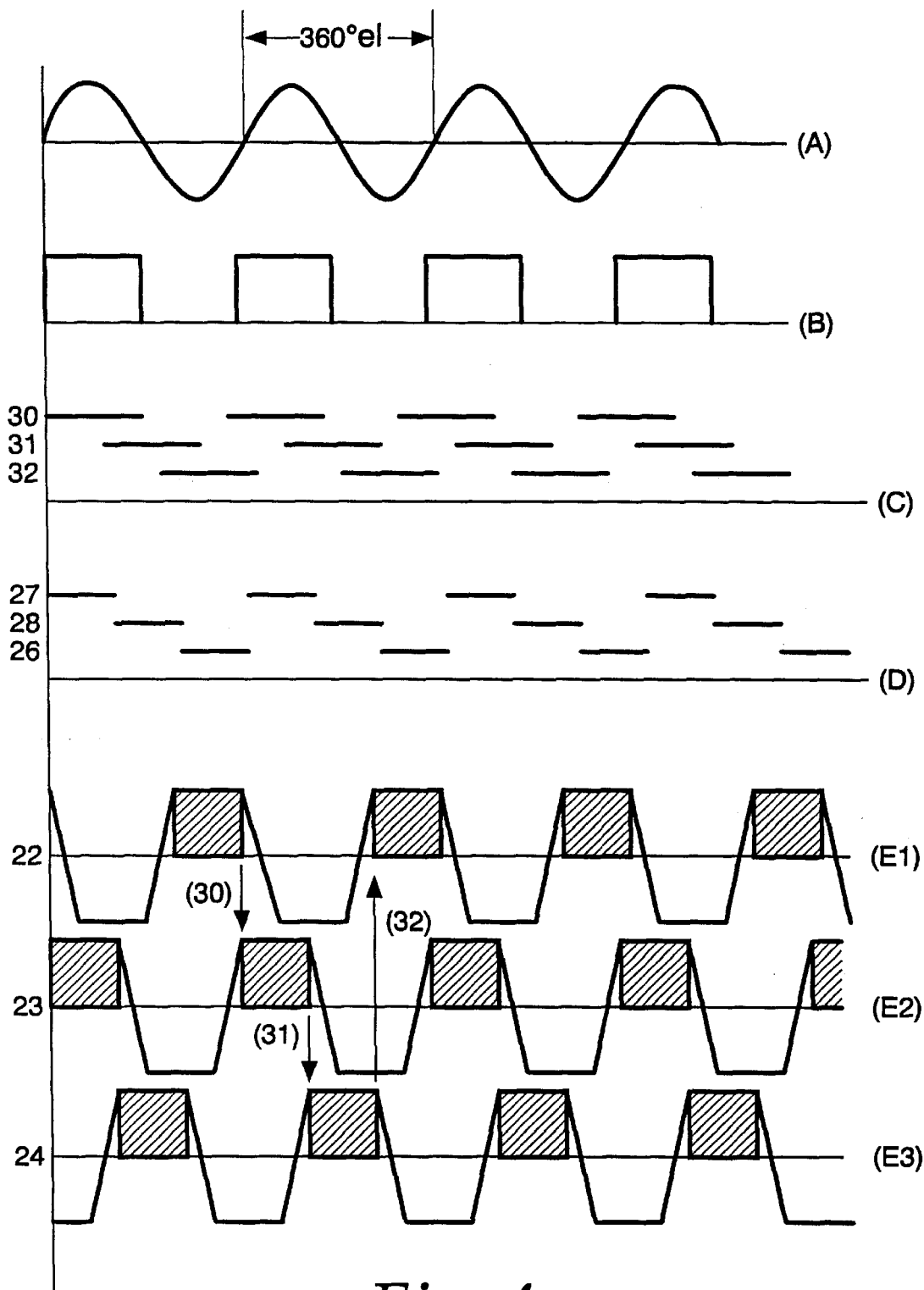
FIG. 4 depicts a set of waveforms referred to in describing the preferred mode of operation of the motor.

The Hall element positions as discussed above have particular significance when the motor of FIG. 1 is operated in the particular type of three-pulse fashion shown in FIG. 4, although persons skilled in the art will understand that other and equivalent contacts may also be employed. FIG. 4A shows the output voltage of one of the motor's three Hall elements. This voltage is cyclical and has a period equal to 360°-electrical. The FIG. 4A voltage is applied to a comparator, or other conventional pulse shaper, to yield the better defined voltage waveform of FIG. 4B, each pulse of which lasts for 180°-electrical. The same applies for the other two Hall elements, but preferably their respective pulse trains are phase-shifted one from the other by 120°-electrical, as shown for the three Hall elements in FIG. 4C, i.e., due to the locations of these three elements. The set of three pulse trains of FIG. 4C is applied to a logic circuit to generate three different pulse trains shown in FIG. 4D. The pulses in each of these trains have a duration of 120°-el., a period of 360°-el., and the three pulse trains are phase-shifted one from the next by 120°-el. Each of the three pulse trains is used to render conductive a respective one of the three transistors 26, 27, 28, so that FIG. 4D also represents the respective conduction times of these transistors. FIGS. 4E1, 4E2, 4E3 depict the theoretically possible and (in the shaded areas) the actual torque contributions of respective ones of the three coil systems, the type of three-pulse operation shown in FIG. 4 being the type that utilizes less than the full torque theoretically possible. Namely, if the respective transistor of one of these phases were always conductive, the associated torque contribution would be sometimes in the correct rotation direction (shown as positive) and sometimes in the non-desired rotation direction (shown as negative); therefore, in this example, the transistors 26–28 are never rendered conductive at times that would produce wrong-direction torque. As can be seen, if one considers only the positive half-cycles of torque (each having a duration of 180°-el.), the torque has a relatively uniform level only during about 120°-el. of the 180°-el. half-cycle; for the approximately 30°-el. at the start and end of each half-cycle, the potential torque contribution is far from being of a steady value. Thus, as shown by the shaded areas, only the 120°-el. intervals are actually employed; i.e., as shown by the transistor conduction times in FIG. 4D, the respective ones of the three phases are energized by current only at the times when their torque contributions will be of a steady value.

It is emphasized that the manner of operation show in FIG. 4 is but exemplary, it being the case that the motor produces only three constituent torque pulses per 360°-el. of rotor rotation, with each torque pulse lasting only 120°-el., not a full 180°-el. Persons skilled in the art will understand that the motor could furnish six such pulses if, for each phase, during the 120°-el. time interval which is shifted by 180°-el. from the respective shaded area, the coil system were to be energized by current of reversed direction, e.g. supplied to the three phases by three further transistors or by other such means.

The substantial closing up of the stator's surface facing the air gap 16 by means of the auxiliary poles 19 is highly desirable, because a large part of the rotor magnetic field crossing over in the illustrated construction to the auxiliary poles would, upon omission of the auxiliary poles, be pulled to the main poles 17 and be added thereto. Functionally this would have the same effect as if the pole faces 18 of the main poles 17 were substantially wider than 180°-el., which would be equivalent to chording. Furthermore, strong jolting would occur. Both these effects are avoided by means of the auxiliary poles 19. On the other hand, however, the auxiliary poles 19 hinder the installation of the non-overlapping coils 22, 23, 24 into the respective stator slots 34.

Figure 2:
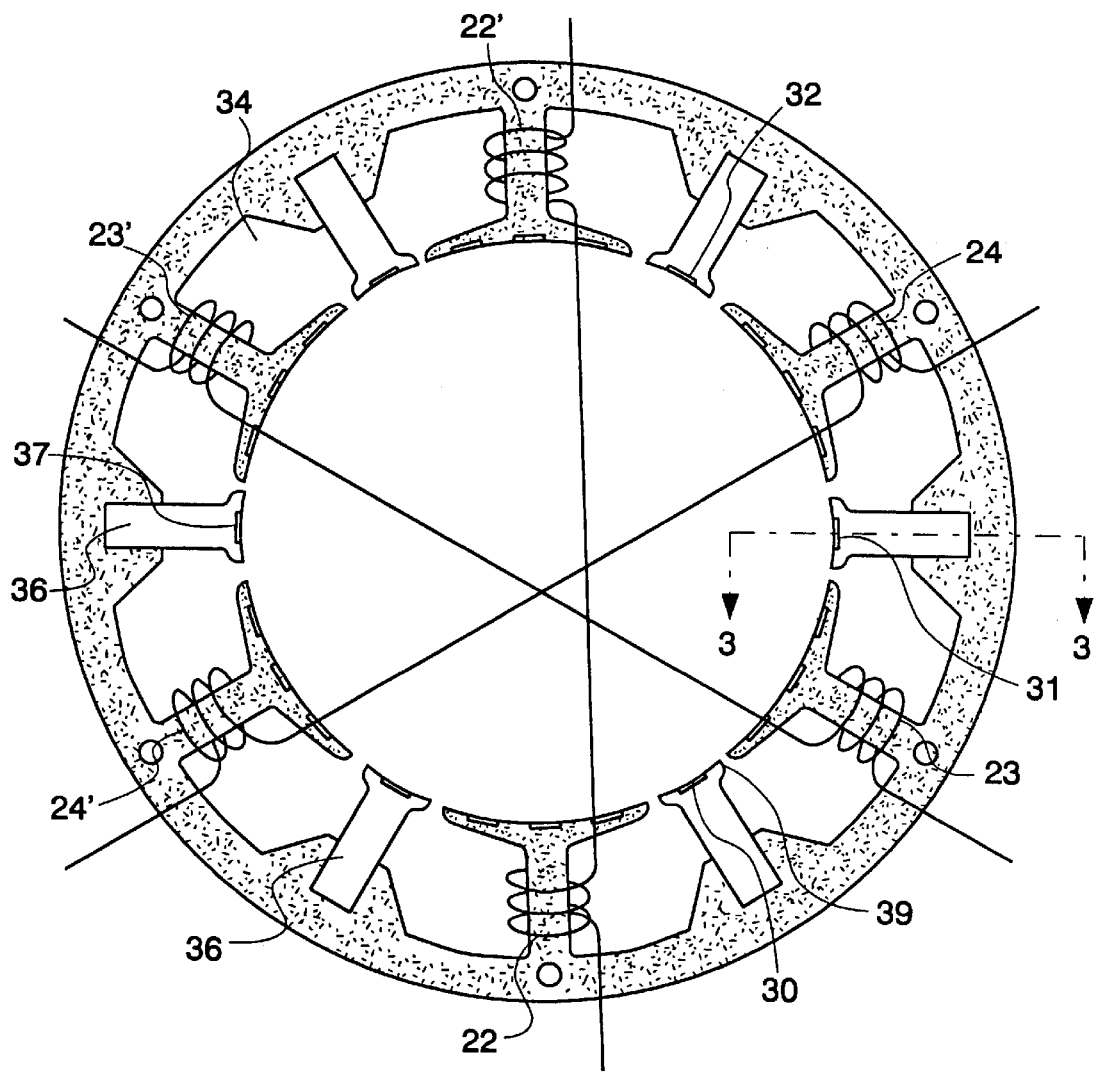
FIG. 2 is a view similar to FIG. 1 for a modified embodiment of the invention.
Figure 3:
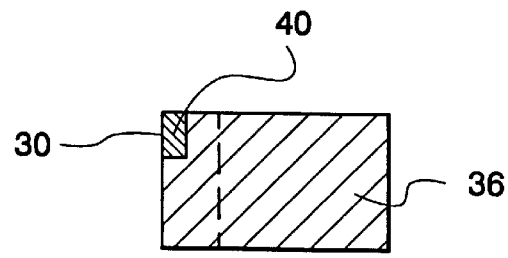
FIG. 3 is a sectional view through an auxiliary pole corresponding to the line III—III of FIG. 2.

In order on the one hand to keep small the slot openings between the main pole faces 18, but on the other hand to provide for windability in a manner suited to fabrication needs, the auxiliary poles in the three-phase brushless dc motor of FIG. 2 (where for simplicity the rotor is not shown) are not stamped out together with the main poles from the sheet metal of the stator's sheet metal stack but instead are designed as separate pole bodies 36 which can be afterwards inserted into corresponding recesses 37 in the stator's sheet metal stack. In this embodiment the main poles 17 are wound with the stator coils 22, 22', 23, 23' and 24, 24', during which the pole bodies 36 forming the auxiliary poles 19 are not yet inserted. Only after the winding of the main poles are the pole bodies 36 pushed into the recesses 37 in order to substantially close up the slot openings 39. The pole bodies 36 preferably consist of non-laminated, solid material. The pole bodies 36 preferably consist of non-laminated, solid material. The circumferential extent of 60°-el. of the auxiliary poles is relatively small compared to the circumferential extent of 180°-el. of the main pole faces 18 and, in correspondence thereto, they accept only a relatively small magnitude flux; as a result, pole bodies 36 made from solid material do not lead to substantial eddy-current losses. The pole bodies 36 can advantageously be fabricated from sintered material, especially sintered iron. The sintering process permits the manufacture of dimensionally accurate shapes without subsequent machining. Furthermore suitable for the pole bodies 36 are siliconized iron types, such as for example commercially available from the Vakuumschmelze Company under the trade name "Trafoperm".

The pole bodies 36 provided to form the unwound auxiliary poles 19 can advantageously be provided with recesses 40 (FIG. 3) to accommodate the position sensors 30, 31, 32. Especially when the pole bodies 36 are fabricated using a sintering technique, this necessitates practically no further fabrication cost.

It is to be understood that, with the arrangement of FIG. 2, the rotor can be designed in the same way as in the case of FIG. 1. Whereas FIGS. 1 and 2 depict internal-rotor motors, it is furthermore to be understood that the expedients described above can with advantage be applied in the same way in the case of external-rotor motors.

Concrete embodiments having been described above, the invention itself is defined in the following claims.

What is claimed is:

1. A three-phase brushless DC motor comprising:

a permanent-magnet rotor having at least four rotor poles, a stator for producing a magnetic field for applying a torque to the rotor comprising at least six main stator poles, two main stator poles for each phase of at least three phases of a three-phase winding, each of the main stator poles comprising at least one stator coil arranged in a respective angular location on the stator to thus define a respective energizable stator pole, each main stator pole having a pole face opposing the rotor defining an air gap therebetween, all the stator coils of the stator being arranged on the stator in such a manner that no stator coil overlaps any other stator coil and in such a manner that circumferentially neighboring energizable stator poles are circumferentially spaced from each other, the stator also comprising at leapt six auxiliary poles, each auxiliary pole being positioned between a pair of main stator poles, each auxiliary stator pole having a magnetic-field-sensitive rotor position sensor element, each sensor element of the stator neighboring at least one of the stator coils of the stator where a recess is defined in the stator relative to the pole face, the sensor elements being positioned at respective angular locations of the stator relative to each stator pole for detecting the magnetic flux emanating from the rotor poles of the rotating permanent-magnet rotor while being substantially uninfluenced by the magnetic field produced by the stator, and which command predetermined commutations involving predetermined ones of the three phases, in dependence upon the rotor's angular position associated with predetermined ones of the sensor elements, and at least three current switches responsive to the sensor elements for switching the currents flowing in the stator coils of the three phases to cause the predetermined commutations.

2. The motor of claim 1 wherein each sensor element of the stator is supported at the recess on angular locations which are circumferentially spaced from the neighboring stator poles.

3. The motor of claim 1 comprising a pole body at the recess in the stator for each recess defined in the stator.

4. The motor of claim 3 wherein the pole body comprises a material separate from that of the stator inserted at the recess in the stator.

5. The motor of claim 3 wherein each pole body comprises an pole body face supporting the sensor element at the angular locations circumferentially spaced from the neighboring stator poles.

6. The motor of claim 5 wherein each pole body face opposes the rotor defining an air gap therebetween.

* * * * *